US012571109B2

(12) United States Patent
Sato

(10) Patent No.: US 12,571,109 B2
(45) Date of Patent: Mar. 10, 2026

(54) FUEL CELL SYSTEM

(71) Applicant: TOYOTA JIDOSHA KABUSHIKI KAISHA, Toyota (JP)

(72) Inventor: Hiromichi Sato, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 523 days.

(21) Appl. No.: 18/175,793

(22) Filed: Feb. 28, 2023

(65) Prior Publication Data

US 2023/0287578 A1 Sep. 14, 2023

(30) Foreign Application Priority Data

Mar. 8, 2022 (JP) ................................. 2022-035009

(51) Int. Cl.
| | |
|---|---|
| *C23F 13/14* | (2006.01) |
| *H01M 8/04029* | (2016.01) |
| *H01M 8/10* | (2016.01) |

(52) U.S. Cl.
CPC ......... *C23F 13/14* (2013.01); *H01M 8/04029* (2013.01); *H01M 2008/1095* (2013.01)

(58) Field of Classification Search
CPC ...................................................... Y02E 60/50
See application file for complete search history.

(56) References Cited

U.S. PATENT DOCUMENTS

| | | | |
|---|---|---|---|
| 6,653,008 B1 | 11/2003 | Hirakata et al. | |
| 2003/0052302 A1 | 3/2003 | Eaton et al. | |

| | | | |
|---|---|---|---|
| 2004/0108204 A1* | 6/2004 | Revill | ................. H01M 4/8626 |
| | | | 204/288.1 |
| 2010/0273079 A1 | 10/2010 | Hinsenkamp et al. | |
| 2012/0021310 A1* | 1/2012 | Saito | ......................... F28B 9/08 |
| | | | 429/434 |

(Continued)

FOREIGN PATENT DOCUMENTS

| | | |
|---|---|---|
| JP | 2001155761 A | 6/2001 |
| JP | 2004179115 A | 6/2004 |

(Continued)

*Primary Examiner* — Scott J. Chmielecki
(74) *Attorney, Agent, or Firm* — Dickinson Wright, PLLC

(57) ABSTRACT

A main object of the present disclosure is to provide a fuel cell system capable of inhibiting corrosion of components due to a stray current in a structure of connecting a plurality of fuel cells in series. The present disclosure achieves the object by providing a fuel cell system including a fuel cell, a coolant circuit that circulates a cooling liquid to cool the fuel cell; wherein the fuel cell system includes: as the fuel cell, at least a first fuel cell and a second fuel cell; and as the coolant circuit, at least a first coolant circuit that cools the first fuel cell, and a second coolant circuit that cools the second fuel cell; and the first fuel cell and the second fuel cell are connected in series in a manner the first fuel cell is in a low potential side and the second fuel cell is in a high potential side; the first coolant circuit and the second coolant circuit are respectively connected to a grounding member interposing a first connecting member and a second connecting member; the first coolant circuit includes a sacrifice corrosion member; and the sacrifice corrosion member contacts the first connecting member.

4 Claims, 3 Drawing Sheets

(56)          References Cited

U.S. PATENT DOCUMENTS

| | | | | |
|---|---|---|---|---|
| 2016/0141633 A1* | 5/2016 | Kanno | ................. | H01M 8/241 |
| | | | | 429/465 |
| 2016/0268610 A1* | 9/2016 | Mcclory | ................. | C25D 5/42 |
| 2022/0166220 A1* | 5/2022 | Kuran | ................. | H02J 7/0013 |
| 2023/0167348 A1* | 6/2023 | Yang | ................. | H01M 10/6568 |
| | | | | 429/120 |
| 2024/0006622 A1* | 1/2024 | Ka | ...................... | H01M 8/2483 |
| 2024/0039016 A1* | 2/2024 | Tambo | ............... | H01M 8/2404 |

FOREIGN PATENT DOCUMENTS

| | | | |
|---|---|---|---|
| JP | 2004234881 A | 8/2004 |
| JP | 2004524439 A | 8/2004 |
| JP | 2006066103 A | 3/2006 |
| JP | 2011503812 A | 1/2011 |

* cited by examiner

FUEL CELL SYSTEM

TECHNICAL FIELD

The present disclosure relates to a fuel cell system.

BACKGROUND ART

A fuel cell system is a system of generating power by supplying a fuel gas and an oxidant gas to a fuel cell including a fuel electrode, an electrolyte film, and an oxygen electrode. Also, it has been known that, in the fuel cell system, in order to obtain sufficient power generation performance, a temperature inside the fuel cell is adjusted to a suitable temperature by circulating a cooling liquid.

Meanwhile, the cooling liquid generally has a specified conductivity, and thus, if the cooling liquid works as a conductor, there is a risk that a stray current may occur to cause corrosion of parts of the fuel cell system. On this point, for example, Patent Literature 1 discloses a cooling structure of fuel cell wherein a net shape member placed in an entrance and exit of a coolant is brought to short circuit to inhibit occurrence of potential difference in the coolant. Also, Patent Literature 2 discloses a corrosion prevention structure of a cooling device wherein a conductor makes short circuit between a metal part of a cooling device and a reference electrode side of a battery grounded.

CITATION LIST

Patent Literatures

Patent Literature 1: Japanese Patent Application Laid-Open (JP-A) No. 2001-155761
Patent Literature 2: JP-A No. 2006-066103

SUMMARY OF DISCLOSURE

Technical Problem

From the viewpoint of high output requirement of a fuel cell system, a structure of connecting a plurality of a fuel cell in series has been studied. A main object of the present disclosure is to provide a fuel cell system capable of inhibiting corrosion of components due to a stray current in a structure of connecting a plurality of fuel cells in series.

Solution to Problem

In order to achieve the object, the present disclosure provides a fuel cell system including a fuel cell, a coolant circuit that circulates a cooling liquid to cool the fuel cell; wherein the fuel cell system includes: as the fuel cell, at least a first fuel cell and a second fuel cell; and as the coolant circuit, at least a first coolant circuit that cools the first fuel cell, and a second coolant circuit that cools the second fuel cell; and the first fuel cell and the second fuel cell are connected in series in a manner the first fuel cell is in a low potential side and the second fuel cell is in a high potential side; the first coolant circuit is connected to a grounding member interposing a first connecting member, and the second coolant circuit is connected to the grounding member interposing a second connecting member; the first coolant circuit includes a sacrifice corrosion member; and the sacrifice corrosion member contacts the first connecting member.

According to the present disclosure, in the first coolant circuit, the sacrifice corrosion member contacts the first connecting member, and thus the fuel cell system may inhibit the corrosion of components due to a stray current.

In the disclosure, the first coolant circuit may include a component X; and in the first coolant circuit, the sacrifice corrosion member may be arranged in the first fuel cell side on the basis of the component X.

In the disclosure, the component X may be a component made of an aluminum.

In the disclosure, the component X may be a pump or an intercooler.

In the disclosure, the sacrifice corrosion member may be a component made of Steel Use Stainless.

Advantageous Effects of Disclosure

The present disclosure exhibits an effect of providing a fuel cell system capable of inhibiting corrosion of components due to a stray current.

DESCRIPTION OF EMBODIMENTS

The fuel cell system in the present disclosure will be hereinafter explained in details.

Figure 1:
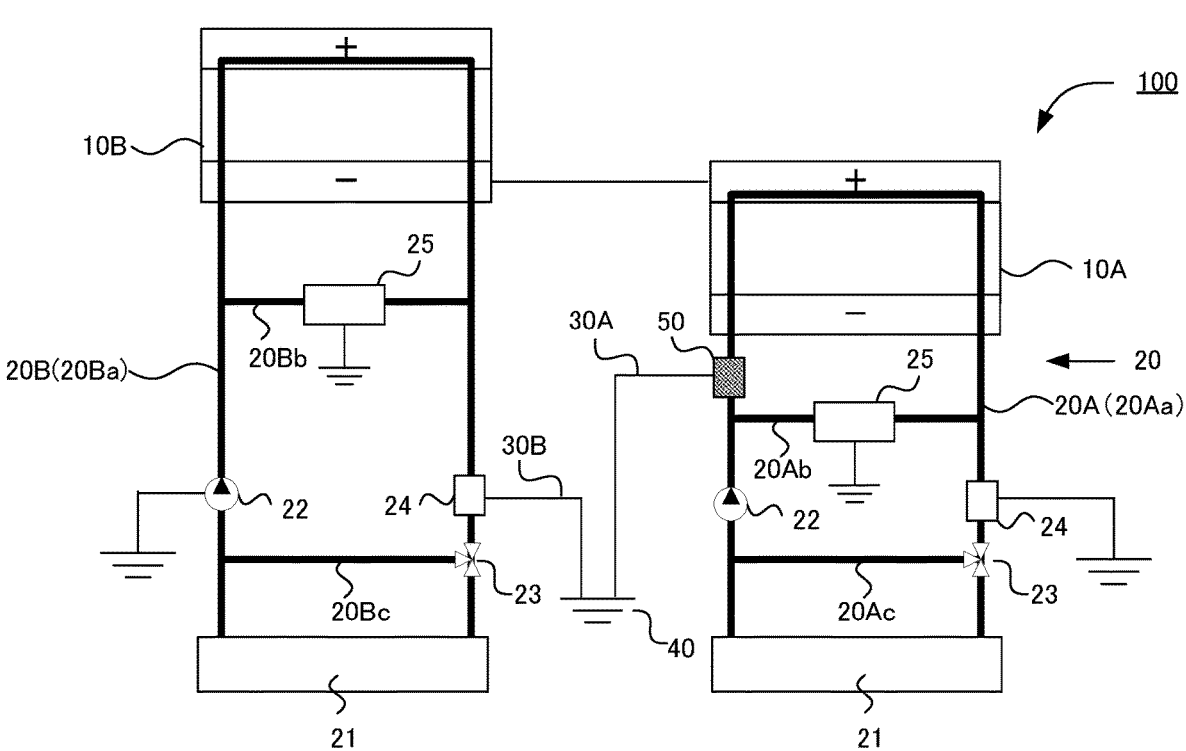
FIG. 1 is a schematic diagram exemplifying the structure of the fuel cell system in the present disclosure.

FIG. 1 is a schematic diagram exemplifying the structure of the fuel cell system in the present disclosure. Fuel cell system 100 shown in FIG. 1 includes fuel cell 10, and coolant circuit 20 that circulates a cooling liquid to cool the fuel cell 10. Also, the fuel cell system 100 includes, as the fuel cell 10, at least first fuel cell 10A and second fuel cell 10B, and as the coolant circuit 20, at least first coolant circuit 20A that cools the first fuel cell 10A, and second coolant circuit 20B that cools the second fuel cell 10B. Also, the first fuel cell 10A and the second fuel cell 10B are connected in series in a manner the first fuel cell 10A is in a low potential side, and the second fuel cell 10B is in a high potential side. Also, the first coolant circuit 20A is connected to grounding member 40 interposing first connecting member 30A, and the second coolant circuit 20B is connected to the grounding member 40 interposing second connecting member 30B. Then, the first coolant circuit 20A includes sacrifice corrosion member 50, and the sacrifice corrosion member 50 contacts the first connecting member 30A.

According to the present disclosure, in the first coolant circuit, the sacrifice corrosion member contacts the first connecting member, and thus the fuel cell system may inhibit the corrosion of components due to a stray current.

Figures 2A, 2B:
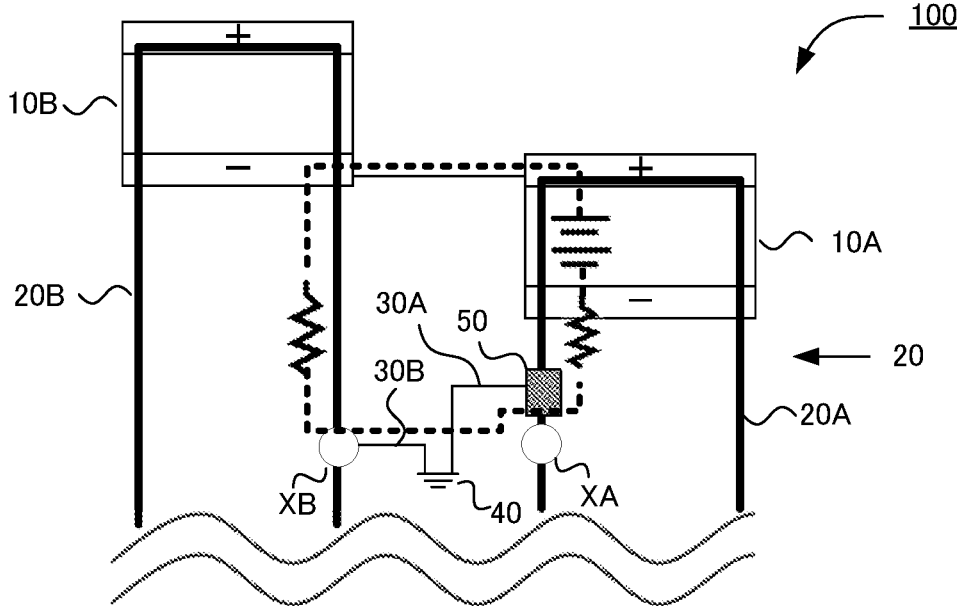
FIGS. 2A and 2B are diagrams explaining the mechanism of corrosion inhibition in the present disclosure.

Here, the mechanism in the present disclosure will be explained with reference to FIGS. 2A and 2B. As shown in FIGS. 2A and 2B, from the viewpoint of high-output requirement of a fuel cell system, a structure of connecting a plurality of a fuel cell (10A, 10B) in series has been studied. On the other hand, when a temperature of such fuel cells connected in series is adjusted by circulating a cooling liquid, it is preferable to build separate cooling systems (coolant circuit 20A, 20B) respectively for each fuel cell, considering matters such as radiation performance of a radiator, and spatial constrain. Also, in the coolant circuit, for example, a component X (a component configuring the coolant circuit; XA, XB in FIGS. 2A and 2B) such as a pump and an intercooler are arranged. Also, from the viewpoint of ensuring safety, component XA and component XB are connected to grounding member 40 interposing first connecting member 30A and second connecting member 30B.

Meanwhile, since the cooling liquid has a specified conductivity, the cooling liquid may work as a conductor in some cases. In that case, as shown in FIGS. 2A and 2B, there is a risk that a stray current may occur from the high potential fuel cell 10B toward the low potential fuel cell 10A interposing the grounding member 40. Also, as shown in FIG. 2A, when the component XA is connected to the grounding member 40, there is a risk that the component XA may be a passage of a stray current to cause corrosion (stray current corrosion) of the component XA.

In contrast, in the fuel cell system in the present disclosure, as shown in FIG. 2B, the first coolant circuit 20A includes sacrifice corrosion member 50, and the sacrifice corrosion member 50 contacts the first connecting member 30A. As a result, if a stray current occurs, the stray current will not flow in the component XA, but will flow in the sacrifice corrosion member 50. Thereby, the corrosion of the component XA can be inhibited.

Incidentally, in the structure of connecting a plurality of fuel cells in series, in order to satisfy the high voltage safety requirement (such as a regulation UN-100), it is required to increase the insulation resistance of the cooling liquid from the fuel cell until a connecting member such as a ground wire. On this point, when a net shape member brought to short circuit with the ground wire is placed in an entrance and exit of a cooling liquid in the fuel cell (fuel cell in low potential side) as in Patent Literature 1, sufficient insulation resistance cannot be secured. Also, if the net shape member is placed in distanced from the fuel cell, considering the effect of a stray current to components, the net shape member needs to be placed in all the piping connected to the coolant circuit, and thereby the system would be complicated. Also, in FIG. 2A, as in Patent Literature 2, when the component XA with concern of corrosion due to stray current is brought to short circuit with the negative pole of the fuel cell 10A, sufficient insulation resistance cannot be secured.

On the other hand, the sacrifice corrosion member is used in the present disclosure, and thus sufficient insulation resistance from the fuel cell until the connecting member is easily secured, and it is also advantageous in the point that the complication of the system can be avoided.

1. Fuel Cell

The fuel cell system in the present disclosure includes at least a first fuel cell and a second fuel cell. Also, the first fuel cell and the second fuel cell are connected in series in a manner the first fuel cell is in a low potential side, and the second fuel cell is in a high potential side.

The difference between the anode voltage of the first fuel cell and the anode voltage of the second fuel cell is not particularly limited as long as the anode voltage of the first fuel cell is lower than the anode voltage of the second fuel cell. The difference between the anode voltage of the first fuel cell and the anode voltage of the second fuel cell is, for example, 50 V or more, may be 70 V or more, and may be 100 V or more. Meanwhile, the difference between the both anode voltages is, for example, 250 V or less and may be 200

V or less. Incidentally, the cathode voltage of the first fuel cell is usually equivalent potential to the anode voltage of the second fuel cell.

Figure 3:
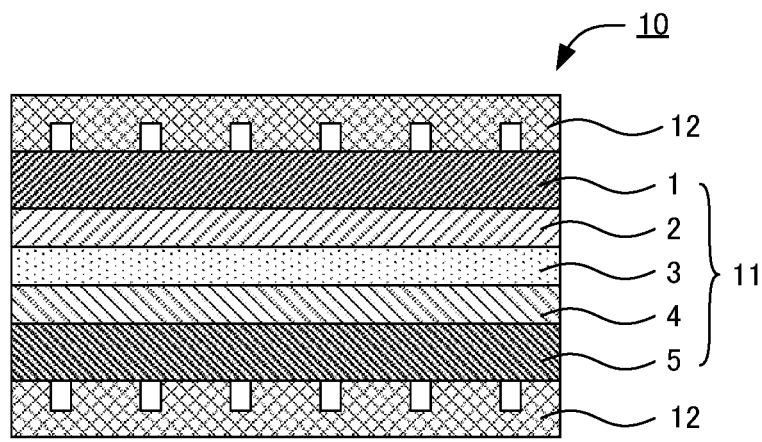
FIG. 3 is a schematic cross-sectional view exemplifying the fuel cell in the present disclosure.

FIG. 3 is a schematic cross-sectional view exemplifying the fuel cell in the present disclosure. Fuel cell (single cell) 10 shown in FIG. 3 includes membrane—electrode assembly (MEA) 11 including layers in the order of: cathode side gas dispersing layer 1, cathode catalyst layer 2, electrolyte film 3, anode catalyst layer 4, and anode side gas dispersing layer 5; and two pieces of separator 12 that holds the MEA 11. The fuel cell may be a single cell, and may be a layered body in which a plurality of the single cell is layered.

Examples of the electrolyte film may include a fluorine based electrolyte film such as a perfluoro sulfonic acid film, and a non-fluorine based electrolyte film. Examples of the non-fluorine based electrolyte film may include a hydrocarbon based electrolyte film. The thickness of the electrolyte film is, for example, 5 μm or more and 100 μm or less.

The cathode catalyst layer and the anode catalyst layer include, for example, a catalyst metal promoting electrochemical reactions, a base material supporting the catalyst metal, an electrolyte with proton conductivity, and a carbon particle with electron conductivity. Examples of the catalyst metal may include a simple substance of metal such as Pt (platinum) and Ru (ruthenium), and an alloy including Pt. Examples of the electrolyte may include a fluorine based resin. In addition, examples of the base material and a conductive material may include a carbon material such as carbon. The thickness of the cathode catalyst layer and the anode catalyst layer is, for example, respectively 5 μm or more and 100 μm or less.

The anode side gas dispersing layer and the cathode side gas dispersing layer may be a conductive member with gas permeability. Examples of the conductive member may include a carbon porous body such as a carbon cloth and a carbon paper, and a metal porous body such as a metal mesh and a foamed metal. The thickness of the anode side gas dispersing layer and the cathode side gas dispersing layer is, for example, respectively 5 μm or more and 100 μm or less.

The separator may include a gas flow passage in the surface facing the gas dispersing layers (the anode side gas dispersing layer and the cathode side gas dispersing layer). Examples of the material of the separator may include a metal material such as stainless steel, and a carbon material such as a carbon composite material. Incidentally, this separator has electron conductivity, and also works as a current collector of electricity generated.

2. Coolant Circuit

An example of the coolant circuit in the present disclosure will be explained with reference to drawings. Fuel cell system 100 shown in FIG. 1 includes, as coolant circuit 20, at least first coolant circuit 20A that cools the first fuel cell 10A, and second coolant circuit 20B that cools the second fuel cell 20B.

Also, the first coolant circuit 20A and the second coolant circuit 20B include main passage 20Aa and main passage 20Ba, as well as bypass passages 20Ab to 20Ac, and bypass passages 20Bb to 20Bc. The main passage (20Aa, 20Ba) is a circular passage that cools the cooling liquid flowed out from fuel cell (10A, 10B) by radiator 21, and to flow again into the fuel cell (10A, 10B). The bypass passage (20Ab to 20Ac, 20Bb to 20Bc) is a passage branched off from the main passage (20Aa, 20Ba).

In the main passage (20Aa, 20Ba), arranged are radiator 21 that cools the cooling liquid by heat exchanging, pump 22 that pumps the cooling liquid, three way valve 23 that adjusts the flow amount of the cooling liquid, and metal pipe

24. In the bypass passage (20Ab, 20Bb), inter cooler 25 that conducts heat exchanging between the cooling liquid and the air supplied to the fuel cell (10A, 10B) is arranged. Incidentally, although not illustrated in particular, an ion exchanger that absorbs and removes ions from the cooling liquid may be arranged. Also, the bypass passage (20Ac, 20Bc) is a passage configured to make the cooling liquid flowed out from the fuel cell 10 to flow again into the fuel cell without passing the radiator 21. Incidentally, although not illustrated, the coolant circuit may include a reserve tank that stores the cooling liquid. Also, the coolant circuit may include a bypass passage communicating the radiator and the reserve tank, and a bypass passage communicating the reserve tank and the main passage.

In the first coolant circuit 20A, the sacrifice corrosion member 50 arranged on the main passage 20Aa is connected to the first connecting member 30A. Also, in the second coolant circuit 20B, the metal pipe 24 arranged on the main passage 20Ba is connected to the second connecting member 30B. Thereby, the first coolant circuit 20A is connected to a grounding member interposing the first connecting member 30A and the second coolant circuit 20B is connected to the grounding member interposing the second connecting member 30B. The connecting member is a conductive line such as a ground wire, which can release current to the grounding member. The grounding member may be the ground, and may be a chassis of a vehicle.

The first coolant circuit includes a component X as its component part. The component X may be, for example, a metal component, and is preferably a component made of an aluminum above all. Aluminum has advantages on the points of mass, thermal characteristic, cost, and processability. In the present disclosure, there are no particular limitations on the component made of an aluminum, if a metal aluminum is used as a material. The component made of an aluminum preferably contains a metal aluminum as a main material. The component made of an aluminum may be a single component configured by a component of one kind, and may be a composite component configured by components of several kinds. Specific examples of the component X may include the pump 22 and the intercooler 25 in FIG. 1.

Also, sensors such as a temperature sensor that measures the temperature of the cooling liquid, and a conductivity meter that measures the conductivity of the cooling liquid, may be arranged in the coolant circuit. Also, as the cooling liquid, a general cooling liquid may be used. The cooling liquid may be water, and may be an anti-freezing solution such as an ethylene glycol-containing liquid.

3. Sacrifice Corrosion Member

The sacrifice corrosion member is arranged in the above described first coolant circuit, and contacts the first connecting member.

The sacrifice corrosion member may be arranged in just one place, and may be arranged in several places of the first coolant circuit. The sacrifice corrosion member in the first coolant circuit may be arranged in a side to where the cooling liquid flows into the fuel cell, may be arranged in a side to where the cooling liquid flows out from the fuel cell, and may be arranged in the both sides.

Figure 4:
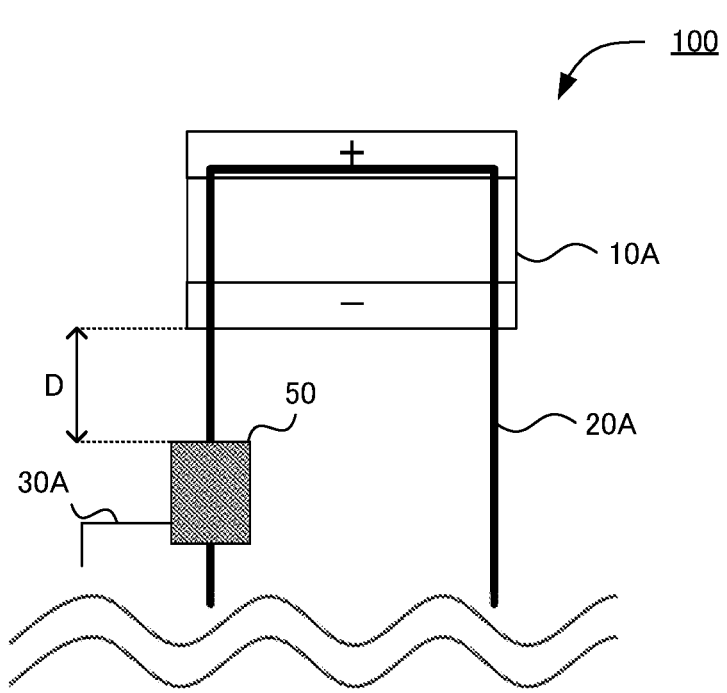
FIG. 4 is a diagram explaining the position of the sacrifice corrosion member in the present disclosure.

As shown in FIG. 4, when D designates a distance from an entrance or an exit of the cooling liquid of the first fuel cell 10A until the sacrifice corrosion member 50, the distance D is preferably a distance capable of securing sufficient insulation resistance. The distance D is, for example, preferably a distance capable of acquiring insulation resistance of 100Ω or more per operation voltage 1 V of the fuel cell system, as a whole vehicle, when the fuel cell system in the present disclosure is used in the vehicle. Also, the distance D is, for example, 30 cm or more and may be 40 cm or more.

The sacrifice corrosion member is, for example, arranged as a pipe in the coolant circuit. The whole of the sacrifice corrosion member (pipe) may contain a material with high reaction overvoltage, which will be described later, and a part of the sacrifice corrosion member may contain a material with high reaction overvoltage, which will be described later. In the latter case, it is preferable that a part that is closest to the fuel cell and that contacts the cooling liquid contains the material with high reaction overvoltage. The reason therefor is because it is the shortest where a stray current flows into.

Also, if a component such as a component made of an aluminum is arranged in the above described first coolant circuit, the sacrifice corrosion member may be arranged closer to the first fuel cell side than the component.

The sacrifice corrosion member preferably contains a material with high reaction overvoltage, and particularly preferably contains a material with higher reaction overvoltage than that of a metal aluminum. Examples of the sacrifice corrosion member may include a metal component such as a component made of Steel Use Stainless. The component made of Steel Use Stainless preferably contains Steel Use Stainless as a main component. The component made of Steel Use Stainless may be a single component configured by a component of one kind, and may be a composite component configured by components of several kinds.

4. Fuel Cell System

The fuel cell system may include a secondary battery. The secondary battery may be the one that can be charged and discharged, and examples thereof may include a nickel hydrogen secondary battery, and conventionally known secondary batteries such as a lithium ion secondary battery. Also, the secondary battery may be the one including a storage element such as an electric double layer capacitor. The secondary battery may have a structure in which a plurality of the piece is connected in series. The secondary battery supplies power to an oxidant gas supplying part such as a motor and an air compressor. The secondary battery may be chargeable from power sources outside the vehicle such as a household power source. The secondary battery may be charged by the output of the fuel cell.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

REFERENCE SIGNS LIST

10 fuel cell
10A first fuel cell
10B second fuel cell
20 coolant circuit
20A first coolant circuit
20B second coolant circuit
30A first connecting member
30B second connecting member
40 grounding member
50 sacrifice corrosion member
100 fuel cell system

What is claimed is:

1. A fuel cell system comprising a fuel cell, and a coolant circuit that circulates a cooling liquid to cool the fuel cell; wherein the fuel cell system includes:

as the fuel cell, at least a first fuel cell and a second fuel cell; and as the coolant circuit, at least a first coolant circuit that cools the first fuel cell, and a second coolant circuit that cools the second fuel cell; and the first fuel cell and the second fuel cell are connected in series in a manner the first fuel cell is in a low potential side, and the second fuel cell is in a high potential side;

the first coolant circuit is connected to a grounding member interposing a first connecting member, and the second coolant circuit is connected to the grounding member interposing a second connecting member;

the first coolant circuit includes a sacrifice corrosion member; and the sacrifice corrosion member contacts the first connecting member.

2. The fuel cell system according to claim 1, wherein:

the first coolant circuit includes a pump or an intercooler; and in the first coolant circuit, the sacrifice corrosion member is arranged in the first fuel cell side on the basis of the pump or the intercooler.

3. The fuel cell system according to claim 2, wherein the pump or the intercooler is a component made of an aluminum.

4. The fuel cell system according to claim 1, wherein the sacrifice corrosion member is a component made of stainless steel.

* * * * *